United States Patent [19]
Tada et al.

[11] Patent Number: 5,183,400
[45] Date of Patent: Feb. 2, 1993

[54] PIPE CONNECTION STRUCTURE OF A COMPRESSOR

[75] Inventors: Takemi Tada; Hirosi Tanaka; Osami Usui, all of Tochigi, Japan

[73] Assignee: Hitachi, Ltd., Tokyo, Japan

[21] Appl. No.: 746,629

[22] Filed: Aug. 19, 1991

[30] Foreign Application Priority Data

Sep. 7, 1990 [JP] Japan .................................. 2-235628

[51] Int. Cl.⁵ ............................................. F04B 21/00
[52] U.S. Cl. .................................. 417/572; 417/902; 285/286; 285/287
[58] Field of Search .................. 417/902, 572; 285/22, 285/286, 287

[56] References Cited

U.S. PATENT DOCUMENTS

| | | | |
|---|---|---|---|
| 1,963,421 | 6/1934 | Robinson et al. | 285/287 |
| 2,409,795 | 10/1946 | Rabezzana | 285/22 |
| 3,871,800 | 3/1975 | Slayton | 417/902 |

FOREIGN PATENT DOCUMENTS

| | | | |
|---|---|---|---|
| 0112241 | 9/1978 | Japan . | |
| 0129285 | 11/1982 | Japan . | 417/902 |
| 0129286 | 11/1982 | Japan . | |
| 0255265 | 12/1985 | Japan . | |
| 6354916 | 10/1988 | Japan . | |

Primary Examiner—Richard A. Bertsch
Assistant Examiner—Charles G. Freay
Attorney, Agent, or Firm—Antonelli, Terry, Stout & Kraus

[57] ABSTRACT

A closed type compressor has a casing, a compression mechanism section housed in the casing, an intake pipe member which extends through a burring hole in the casing and which is connected to an intake port of the compression mechanism section, an annular pipe insertion member airtightly bonded to a peripheral edge of the burring hole, and a tubular member fitted into an inner peripheral surface of the pipe insertion member and airtightly bonded to this inner peripheral surface by brazing. The intake pipe member extends through the tubular member to the intake port and is airtightly connected to the tubular member by welding. A plurality of grooves are formed in the outer peripheral surface of the tubular member or in the inner peripheral surface of the pipe insertion member over the entire circumference of the surface. The brazing material is received in the grooves.

12 Claims, 2 Drawing Sheets

PIPE CONNECTION STRUCTURE OF A COMPRESSOR

BACKGROUND OF THE INVENTION

1. Field of the Invention

The present invention relates to a pipe connection structure of a closed type compressor and, more particularly, a pipe connection structure wherein a tubular member, to which an intake pipe member connected to an intake port of a rotary compression mechanism section is brazed, and an annular pipe insertion member, which is airtightly connected to a peripheral edge of a burring hole in a closed casing or container of the compression mechanism section, are connected. The present invention also relates to a closed type compressor having such a pipe connection structure.

2. Description of the Prior Art

A pipe connection structure of a conventional closed type compressor comprises a pipe to which an intake pipe member, adapted to be inserted into the intake port of a compression mechanism section, is brazed and a pipe insertion member to be welded to the peripheral edge of a burring hole in a closed container in which the compression mechanism section is housed. The pipe and the pipe insertion member are bonded together by brazing along the peripheral surfaces thereof where they contact each other. There is a clearance between the inner peripheral surface of the pipe insertion member and the outer peripheral surface of the pipe which is inserted into the pipe insertion member over the entire circumference of these surfaces. Such a conventional technique is disclosed in Japanese Unexamination Patent Publication No. 63-54916 but has a number of problems as described below.

Since there is a clearance between the pipe insertion member and the pipe over the entire circumference thereof, there is a possibility that the pipe will be brazed in a furnace in an inclined position to the pipe insertion member. An additional process and a jig for preventing such inclination are required. When the pipe is eccentrically positioned to the pipe insertion member, there is an area where there is no clearance, with a result being that it is difficult for the brazing material to flow into such area and incomplete brazing occurs. In addition, since there is a clearance between the pipe insertion member and the pipe over the entire circumference of the two members, a large amount of brazing material is consumed.

SUMMARY OF THE INVENTION

The present invention has been devised to solve the above-mentioned problems. Accordingly, an object of the present invention is to provide a highly reliable pipe connection structure of a compressor in which leakage of gas at a brazed section is prevented by eliminating the inclination between the pipe insertion member and the pipe and in which the amount of brazing material used in the brazed section is reduced.

Another object of the present invention is to provide a compressor having a pipe connection structure as described above.

According to the present invention, a pipe connection structure is provided for a closed type compressor of the type that has a casing, a compression mechanism section housed in the case, an intake pipe member which extends through a burring hole in the case and which is connected to an intake port of the compression mechanism section, with the connection structure comprising an annular pipe insertion member airtightly connected to a peripheral edge of the burring hole, and a tubular member is fitted into an inner peripheral surface of the pipe insertion member and airtightly bonded thereto by brazing. The intake pipe member extends through the tubular member to the intake port and is airtightly bonded to the tubular member by welding. A plurality of grooves are formed in the outer peripheral surface of the tubular member or in the inner peripheral surface of the pipe insertion member over the entire circumference of these surfaces. The brazing material is received in the grooves. Each of the grooves has a length at least equal to the axial dimension of the area over which the pipe insertion member and the tubular member are engaged with each other.

According to further features of the present invention, a closed type compressor is provided which comprises a casing having a burring hole; a compression mechanism section being housed in the casing and having an intake port. An intake pipe member extends through the burring hole in the casing and is connected to the intake port of the compression mechanism section. An annular pipe insertion member is airtightly bonded to a peripheral edge of the burring hole, and a tubular member is fitted into an inner peripheral surface of the pipe insertion member and airtightly bonded thereto by a brazing material. The intake pipe member extends through the tubular member to the intake port and is airtightly bonded to the tubular member by welding. A plurality of grooves are formed either in the outer peripheral surface of the tubular member or in the inner peripheral surface of the pipe insertion member over the entire circumference of the surface. The brazing material is received in the grooves. Each of the grooves has a length at least equal to the axial dimension of the area over which the pipe insertion member and the tubular member are engaged with each other.

By virtue of the features of the present invention the following advantages may be obtained.

Since a great number of grooves, through which the brazing material flows, are provided over the entire circumference of the peripheral surface on which the pipe insertion member and the tubular member contact, the brazing material flows evenly to the entire circumference thereof and there is no area where the brazing material does not exist. Therefore, refrigerant gas inside the closed casing will not leak.

Since the pipe insertion member and the tubular member are constructed so as to be press-fitted to each other, the tubular member is never brazed in an inclined position with respect to the axis of the pipe insertion member. Thus, defective assembly due to the inclination of the tubular member does not occur.

Regarding the clearance into which the brazing material flows, the clearance formed by the grooves is not continuous because in the present invention a plurality of grooves through which a brazing material flows are provided over the entire circomference in contrast to a continuous clearance over the entire circumference as in the prior art. Thus, the amount of the brazing material used can be reduced in comparison with the prior art and, therefore, a compressor can be provided at a lower cost.

These and other objects, features and advantages of the present invention will become more apparent by the following description with reference to the accompanying drawings.

DESCRIPTION OF THE PREFERRED EMBODIMENT

Figure 1:
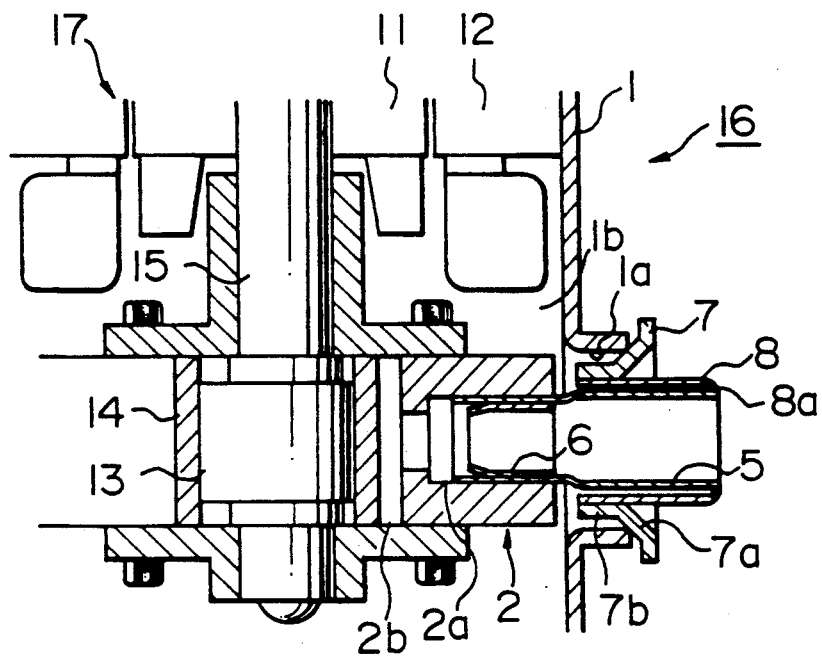
FIG. 1 is an axial-sectional view of a part of a compressor mechanism section of a compressor of an embodiment of the present invention.

Referring to FIG. 1, a rotary compressor generally designated by the reference numeral 16 comprises a compression mechanism section generally designated by the reference numeral 2 and a closed casing 1 housing the compression mechanism section 2. A motor generally designated by the reference numeral 17 for driving the compression mechanism section 2 is provided in the case 1. A stator 12 of the motor 17 is mounted in the case 1. A rotor 11 of the motor 17 is provided with a rotary driving shaft 15. The driving shaft 15 has an eccentric section 13 which causes a rotor 14 of the compression mechanism section 2 to rotate in a cylinder chamber 2b of the compression mechanism section 2.

One end of an intake pipe member 5 is inserted into an intake port 2a of the compression mechanism section 2. The other end of the intake pipe member 5 is connected to a refrigerating cycle copper pipe (not shown) by brazing. An iron bushing 6 is press-fitted into the one end of the intake pipe member 5 such that this end of the intake pipe member 5 is enlarged into a closely contacting relationship with the inner peripheral surface of the intake port 2a. A burring hole 1a is formed in the casing 1. A collar 7 constituting the pipe insertion member is connected to the burring hole 1a. The collar 7 is made of iron and has a conical section 7a and an integral cylindrical section 7b. The conical section 7a is bonded, by electrical resistance welding, to the inner peripheral edge of the entry of the burring hole 1a. A copper sleeve 8, constituting a tubular member for concentrically receiving the intake pipe member 5, is press-fitted into the inner peripheral surface 7d of the cylindrical section 7b of the collar 7. The inner peripheral surface 7d and the copper sleeve 8 is bonded by brazing. The intake pipe member 5 and the copper sleeve 8 are bonded by brazing 8a on the outside of the casing 1. High-pressure refrigerant gas in the inside 1b of the case 1 is sealed so that the gas will not leak to the atmosphere.

Figure 2A:
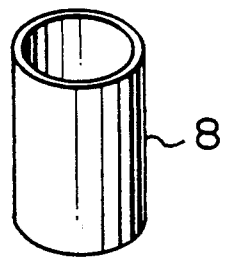
FIGS. 2A and 2B are perspective views of a copper pipe and a collar provided in the compressor.
Figure 3:
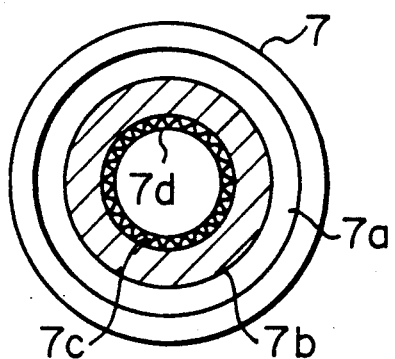
FIG. 3 is an enlarged cross-sectional view of the collar of FIG. 2B, showing a cross-sectional shapes of grooves provided in the cylindrical section of the collar.
Figure 2B:
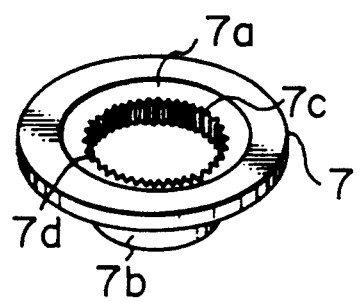

As can be seen from FIGS. 2A, 2B and 3, a plurality of grooves 7c are formed in the inner peripheral surface 7d of the cylindrical section 7b of the collar 7 over the entire circumference thereof. These grooves 7c are provided so to receive a brazing material therein. The length of each of the grooves 7c is not less than the width (axial dimension) of the inner peripheral surface 7d on which the copper sleeve 8 and the cylindrical section 7b contact. That is, in the embodiment shown, each of the grooves 7c extends parallel to the axial direction of the collar 7, but they may extend at an inclination with respect to this axial direction.

The grooves 7c are formed at a pitch interval in the range of 5° to 20° about the axis of the peripheral surface 7d on which the collar 7 and the copper sleeve 8 contact. As shown in FIG. 3, the grooves 7c are formed by press machining such that the cross sectional each groove 7c is of the shape of a triangle. However, the grooves may alternatively be formed in the shape of a semicircle or trapezoid.

Moreover, it is desirable that the depth of the grooves 7c be such that, when the copper sleeve 8 is press-fitted into the collar 7, a clearance made by the grooves 7c can be provided between the copper sleeve 8 and the collar 7. Considering the fact that if such grooves are too deep a large amount of brazing material must be used, such grooves should, preferably, be between 0.05 and 0.5 mm in depth.

An operation for assembling the collar 7 and the copper sleeve 8 will now be explained.

First, the copper sleeve 8 is press-fitted into the peripheral surface 7d of the cylindrical section 7b of the collar 7. As a result, the copper sleeve 8 is brought into abutment with the peak parts of the grooves 7c, resulting in the copper sleeve 8 being press-fitted into the cylindrical section 7b so that a space is formed in the root section of each of the grooves 7c between the copper sleeve 8 and the cylindrical section 7b. While the collar 7 is maintained in press-fitted engagement with the copper sleeve 8 as described above, a copper ring (not shown) employed as a brazing material is wound on the outer peripheral surface of the copper sleeve 8 in the vicinity of the conical section 7a of the collar 7 to form an assembly which is then put into a furnace and heated. As a result, the brazing material flows into the spaces formed by a plurality of grooves 7c disposed over the entire circumference of the peripheral surface 7d at which the collar 7 and the copper sleeve 8 contact, so that the collar 7 and the copper sleeve 8 are bonded by copper brazing.

In this embodiment, since the copper sleeve 8 is press-fitted into the cylindrical section 7b of the collar 7, the copper sleeve 8 is prevented from being brazed at an inclined position with respect to the axis of the collar 7. Consequently, jigs for holding the copper sleeve 8 brazing in a furnace are not needed. Defects due to the inclination of the copper sleeve 8 with respect to the collar 7 will also not occur.

Since grooves 7c, into which the brazing material flows, are provided over the entire circumference of the surface at which the collar 7 and the copper sleeve 8 contact, the brazing material can flow evenly over the entire circumference to form a seal between the two members. Therefore, refrigerant gas will not leak through the contact surface. In addition, the amount of the brazing material to be used can be reduced.

The compressor 16 shown in FIG. 1 operates as described below. When the compressor 16 begins to be operated by the motor 17, refrigerant gas inside the refrigerating cycle (not shown) is suctioned through the intake pipe member 5 and the intake port 2a of the compression mechanism section 2 into the cylinder chamber 2b, so that the gas is compressed to a high pressure level inside the cylinder chamber 2b and then discharged into the space 1b inside the closed casing 1 and is thereafter discharged through a discharge pipe (not shown), connected to the closed casing 1, into the external refrigerating cycle (not shown) outside the compressor.

Figure 4A:
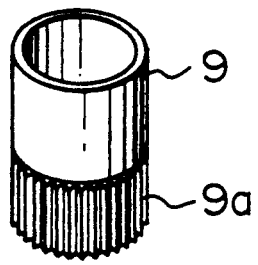
FIGS. 4A and 4B are perspective views of modified copper pipe and collar.
Figure 4B:
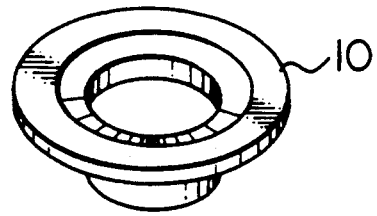

In the embodiment shown in FIGS. 4A and 4B, a plurality of grooves 9a into which a brazing material on the surface at which a copper sleeve 9 and a collar 10 contact flows are formed in the outer peripheral surface of the copper sleeve 9.

The length of each of the grooves 9a is greater than the width (axial dimension) of the peripheral surface along which the sleeve 9 and the collar 10 contact. The depth of each grooves 9a is set to be 0.05 to 0.5 mm. The grooves 9a are formed at a pitch interval of between 5° and 20° degrees about the axis of the copper sleeve 9 which is concentric to the axis of this peripheral surface. Although the grooves in FIG. 4A are each shaped to have a cross section of a triangle, they may be shaped to have a trapezoidal or semicircular cross section.

The embodiment shown in FIGS. 4A and 4B is exactly similar in advantage to the preceding embodiment shown in FIGS. 2A, 2B, an 3.

Figure 5A:
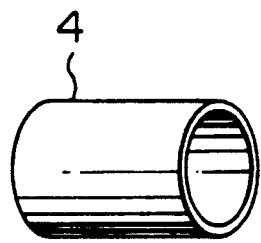
FIGS. 5A and 5B are perspective views of a copper pipe and a collar provided in a conventional compressor.
Figure 5B:
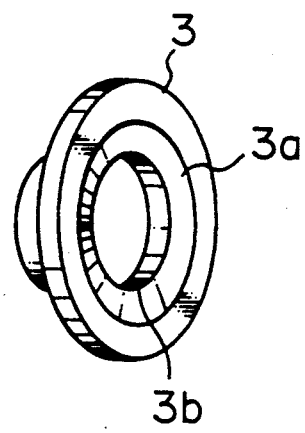

The conventional pipe connection structure comprises a copper sleeve 4 and a collar 3 having a conical section 3a and a cylindrical section 3b, as shown in FIGS. 5A and 5B. However, grooves into which a brazing material flows are not provided in the copper sleeve 4 and the collar 3.

What is claimed is:

1. A pipe connection structure of a closed type compressor of the type that has a casing, a compression mechanism section housed in the casing, an intake pipe member extending through a burring hole in the casing and being connected to an intake port of the compression mechanism section, the connection structure comprising:
    an annular pipe insertion member airtightly connected to a peripheral edge of the burring hole; and
    a tubular member fitted into an inner peripheral surface of the pipe insertion member and airtightly bonded thereto by brazing,
    wherein the intake pipe member extends through the tubular member to the intake port and is airtightly bonded to the tubular member by welding,
    a plurality of grooves are formed in one of the outer peripheral surface of the tubular member and the inner peripheral surface of the pipe insertion member over an entire circumference of both of the surfaces and the brazing material is received in the grooves,
    each of the grooves has a length at least equal to an axial dimension of an area over which the pipe insertion member and the tubular member are engaged with each other, and
    wherein each of the grooves has a depth ranging from 0.05 to 0.5 mm.

2. The pipe connection structure according to claim 1, wherein each of the grooves as a cross-sectional shape of one of triangle, trapezoid and semicircle.

3. The pipe connection structure according to claim 1, wherein said plurality of the grooves are arranged at a pitch of between 5 and 20 degrees about the axis of said area.

4. The pipe connection structure according to claim 1, wherein said pipe insertion member has a conical section and a cylindrical section, and wherein said grooves are formed in the inner peripheral surface of the cylindrical section of said pipe insertion member.

5. The pipe connection structure according to claim 1, wherein said grooves are formed in the outer peripheral surface of said cylindrical member.

6. A closed type compressor, the compressor comprising:
    a casing having a burring hole;
    a compression mechanism section housed in the casing and having an intake port;
    an intake pipe member extending through the burring hole in the casing and being connected to the intake port of the compression mechanism section;
    an annular pipe insertion member airtightly bonded to a peripheral edge of said burring hole; and
    a tubular member fitted into an inner peripheral surface of the pipe insertion member and airtightly connected thereto by a brazing material,
    wherein the intake pipe member extends through the tubular member to the intake port and is airtightly bonded to the tubular member by welding,
    a plurality of grooves are formed in one of the outer peripheral surface of the tubular member and the inner peripheral surface of the pipe insertion member over an entire circumference thereof and the brazing material is received in the grooves,
    each of the grooves has a length at least equal to an axial dimension of an engagement surface at which the pipe insertion member is engaged with the tubular member, and
    wherein each of the grooves has a depth ranging from 0.05 to 0.5 mm.

7. The closed type compressor according to claim 6, wherein each of the grooves has a cross-sectional shape of one of triangle, trapezoid and semicircle.

8. The closed type compressor according to claim 6, wherein said plurality of the grooves are arranged at a pitch of between 5 and 20 degrees about the axis of said engagement surface.

9. The closed type compressor according to claim 6, wherein said pipe insertion member has a conical section and a cylindrical section and, and wherein said grooves are formed in the inner peripheral surface of the cylindrical section of said pipe insertion member.

10. The closed type compressor according to claim 6, wherein said grooves are formed in the outer peripheral surface of said cylindrical member.

11. A pipe connection structure of a closed type rotary compressor of the type that has a substantially closed casing having an opening therein, a compression mechanism disposed in said casing and having a cylinder chamber, and an intake pipe member extending through said opening in said casing and connected to said cylinder chamber, said pipe connection structure comprising:
    a hollow pipe insertion member sealingly connected to said opening by brazing and extending around said intake pipe member; and
    a tubular member fitted into said pipe insertion member and extending in a substantially coaxial relationship with respect to said intake pipe member to support said intake pipe member from said casing,
    wherein grooves are formed in one of the outer peripheral surface of said tubular member and the inner peripheral surface of said pipe insertion member and arranged over an entire circumference thereof to receive the brazing material in the grooves, and
    wherein each of said grooves has a depth ranging from 0.05 to 0.5 mm.

12. A pipe connection structure according to claim 11, wherein said grooves extend substantially axially of said tubular member.

* * * * *